(12) United States Patent
Choi

(10) Patent No.: US 12,528,020 B2
(45) Date of Patent: Jan. 20, 2026

(54) CLUSTERING METHOD OF GAME PLAYERS

(71) Applicant: GNA COMPANY CORP., Seoul (KR)

(72) Inventor: Jiung Choi, Seoul (KR)

(73) Assignee: GNA COMPANY CORP., Seoul (KR)

( * ) Notice: Subject to any disclaimer, the term of this patent is extended or adjusted under 35 U.S.C. 154(b) by 215 days.

(21) Appl. No.: 18/547,122

(22) PCT Filed: Feb. 17, 2022

(86) PCT No.: PCT/KR2022/002351
§ 371 (c)(1),
(2) Date: Aug. 18, 2023

(87) PCT Pub. No.: WO2022/177319
PCT Pub. Date: Aug. 25, 2022

(65) Prior Publication Data
US 2024/0050861 A1      Feb. 15, 2024

(30) Foreign Application Priority Data

Feb. 18, 2021   (KR) .................. 10-2021-0021519

(51) Int. Cl.
*A63F 13/795*       (2014.01)
*G06F 18/23213*     (2023.01)

(52) U.S. Cl.
CPC ...... *A63F 13/795* (2014.09); *G06F 18/23213* (2023.01)

(58) Field of Classification Search
CPC .... A63F 13/795; A63F 13/352; A63F 13/798; A63F 13/71; A63F 13/85; A63F 2300/40; G06F 18/23213; G06F 18/232
(Continued)

(56) References Cited

U.S. PATENT DOCUMENTS

| 8,303,416 B1 * | 11/2012 | Thakkar ............... G06F 3/048 |
| | | 463/42 |
| 10,894,215 B1 * | 1/2021 | Brown .................. A63F 13/35 |

(Continued)

FOREIGN PATENT DOCUMENTS

| JP | 2019091505 A | 6/2019 |
| KR | 1020180057087 A | 5/2018 |

(Continued)

OTHER PUBLICATIONS

Hongjun Joo et al., Improvement of Regional Clustering Using Flood Control Characteristics and t-SNE of Machine Learning, Jun. 30, 2020, pp. 247-257, vol. 20, Journal of the Korean Society of Hazard Mitigation.

*Primary Examiner* — Michael A Cuff
(74) *Attorney, Agent, or Firm* — WILLIAM PARK AND ASSOCIATES LTD.

(57) ABSTRACT

A method for clustering players according to their tendencies, using play data of the players playing games is disclosed. Tags are assigned to each of the games to express the characteristics of each game, and the weights for the tags are calculated based on the play data for each of the players. Each player is classified into plural clusters according to their tendencies, based on the weights calculated for each tag. By classifying and clustering players according to their play tendencies, game developers can target advertising to players who match the characteristics of their games.

7 Claims, 5 Drawing Sheets

(58) Field of Classification Search
USPC .......................................................... 463/42
See application file for complete search history.

(56) References Cited

U.S. PATENT DOCUMENTS

| | | | | |
|---|---|---|---|---|
| 11,238,664 | B1* | 2/2022 | Tavakoli | G06Q 30/0631 |
| 2005/0170890 | A1* | 8/2005 | Rowe | G07F 17/32 |
| | | | | 463/42 |
| 2006/0111979 | A1* | 5/2006 | Chu | G06Q 30/0277 |
| | | | | 705/14.66 |
| 2013/0310156 | A1* | 11/2013 | Gadher | G07F 17/3237 |
| | | | | 463/25 |
| 2014/0274404 | A1* | 9/2014 | Hoskins | A63F 13/335 |
| | | | | 463/42 |
| 2014/0379617 | A1* | 12/2014 | Yang | G06Q 30/0631 |
| | | | | 706/46 |
| 2017/0319967 | A1* | 11/2017 | Chandrasekaran | A63F 13/795 |
| 2018/0127823 | A1* | 5/2018 | Shekhar | G16B 40/00 |
| 2019/0001219 | A1* | 1/2019 | Sardari | G06N 5/025 |
| 2019/0034766 | A1* | 1/2019 | Chen | G06V 10/82 |
| 2019/0091581 | A1* | 3/2019 | Reiche, III | A63F 13/798 |
| 2019/0138636 | A1* | 5/2019 | Sahota | H04L 67/10 |
| 2021/0086089 | A1* | 3/2021 | Pardeshi | G06N 3/04 |
| 2021/0299578 | A1* | 9/2021 | Law | G06F 18/2321 |
| 2022/0088484 | A1* | 3/2022 | Dicken | A63F 13/67 |

FOREIGN PATENT DOCUMENTS

| | | |
|---|---|---|
| KR | 1020190066179 A | 6/2019 |
| KR | 1020190094068 A | 8/2019 |

\* cited by examiner

CLUSTERING METHOD OF GAME PLAYERS

TECHNICAL FIELD

The invention relates to a method for clustering game players, and more particularly, to a method for clustering by classifying the players who play computer games according to their playing tendencies.

BACKGROUND OF THE INVENTION

The development of IT technology has led to the activation of various computer games and many players are enjoying computer games. As game developers release various types of games competitively, it is necessary to market games to computer game players. For this marketing, game developers also entrust the marketing of developed games to marketing agencies.

However, it is difficult for the marketing agencies to propose marketing that targets the main target market suitable for the game developed by the game developer. The current marketing method is that game advertisements are exposed indiscriminately to various media that are used by an unspecified number of people, and therefore it is impossible to expect effective marketing results compared to the effort and cost required for marketing.

DETAILED DESCRIPTION OF THE INVENTION

Problem to be Solved

The invention was devised to solve the above problems, and the purpose of the invention is to provide a method for game developers to target advertising to players who match the characteristics of their games by classifying and clustering players who play computer games according to their playing tendencies.

Technical Solution

To achieve this object, the present invention provides a method for clustering players according to their tendencies, the method performed by a server that collects play data, which is data related to game play of a plurality of players playing games. The method comprises the steps of: a) storing information to which tags that express characteristics of the respective games are assigned for each of the games; b) computing weights for the respective tags based on the play data related to the games to which the tags are assigned, with respect to the players; and c) classifying the players according to their tendencies into a plurality of clusters, based on the weights computed for each of the tags for each of the players.

The play data can include at least one of time and frequency at which each of the players plays each of the games.

In the step (b), the weight is calculated based on a ratio of the time and/or the frequency that each of the players plays the game to which a specific tag is assigned, with respect to the time and/or the frequency that all of the players plays the game to which the specific tag is assigned.

In the step (b), the weight is calculated by assigning predetermined weights to the time and the frequency respectively.

The characteristics of the games are classified into a plurality of categories, and the tags are defined for each of the plurality of categories. In this situation, it is preferable that a plurality of the tags are defined for each of the plurality of categories.

In the step (b), the weight is calculated by assigning predetermined weights to each of the plurality of categories.

The step (c) comprises the steps of: c-1) writing a vector data that vectorizes the weights for each of the tags for each of the players; and c-2) classifying the plurality of clusters by applying a predetermined clustering algorithm to the vector data.

A step of converting the vector data to a low-dimensional vector can be performed before performing the step c-2).

Effect of the Invention

According to the invention, players who play computer games can be classified and clustered according to their playing tendencies. Based on this information about the clustered players, game developers can develop various promotion strategies, such as targeting advertising to players who match the characteristics of their games, or providing differentiated game-related benefits for each cluster.

PREFERRED EMBODIMENT OF THE INVENTION

Here is a more detailed explanation of the invention, referring to the figures.

In the following description, the configurations described as servers, ~~units, and ~~modules can each be composed of a single computer or server, or they can be composed of function modules that are each divided and provided within a single computer or server. For example, a configuration depicted as two individual servers can be composed of a single server in a practical implementation example, and a configuration depicted as a single server can be composed of multiple servers that perform the detailed operations of the server individually. In addition, in the description of the invention, the detailed configuration of the general configuration that is not directly related to the gist of the invention or that is commonly provided is omitted unless it is directly related to the characteristic configuration of the invention.

Figure 1:
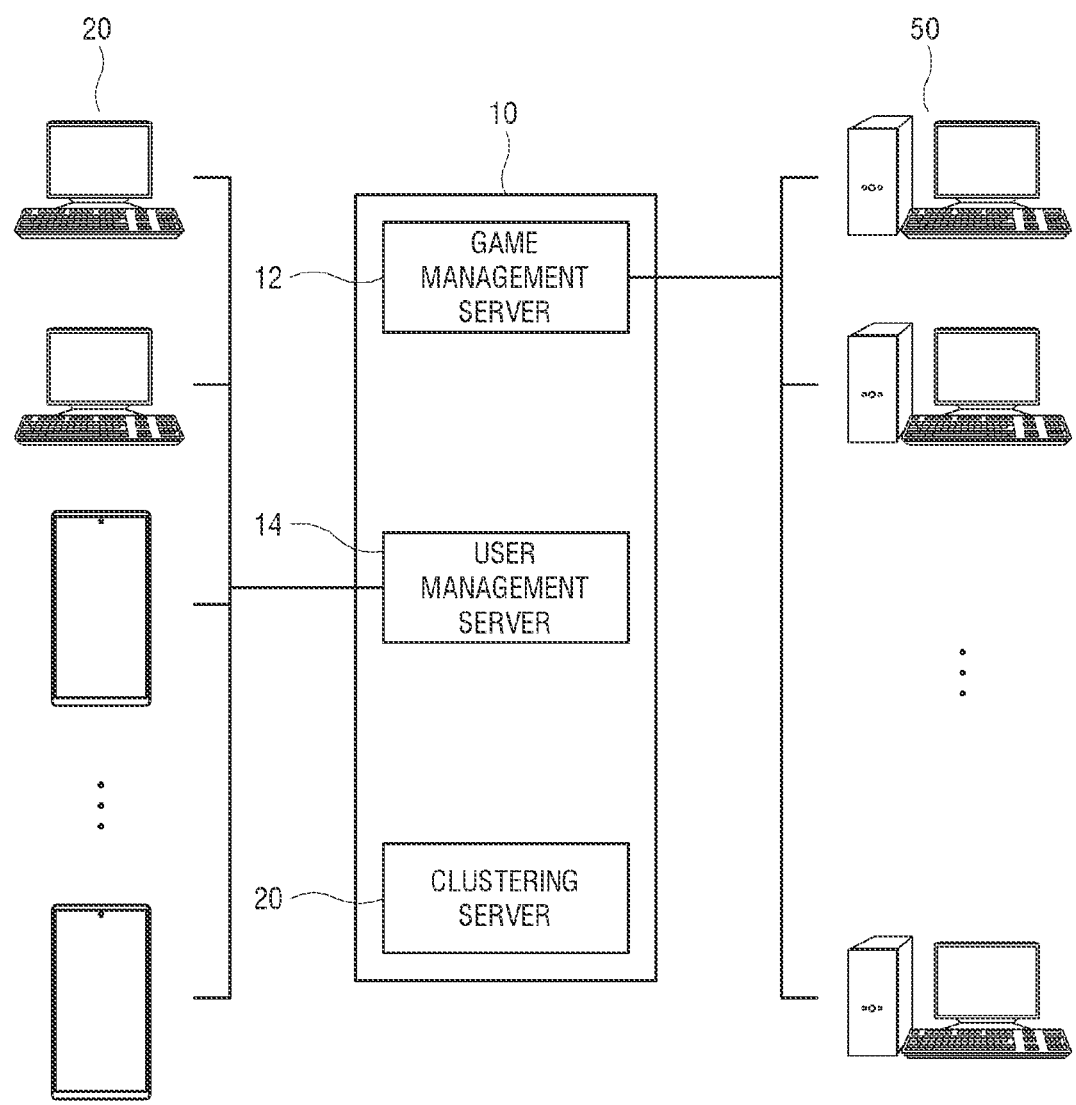
FIG. 1 is a diagram showing the configuration of the overall system that performs the clustering process according to the invention.

FIG. 1 is a diagram showing the configuration of the overall system that performs the clustering process according to the invention. The clustering system 10 according to the present invention includes a plurality of user terminals 70 that are used by each of the players, and a plurality of game provider servers 50 that are used by each of a plurality of game providers. Here, a player is who plays a game, and is the target of clustering in the present invention.

The clustering system 10 according to the present invention is composed of a game management server 12, a user management server 14, and a platform server 20.

The game management server 12 enrolls game providers as members and manages the games provided by game provider servers 50 operated by each game provider. Here, the management includes the registering each of the games provided by game provider servers 50 and registering the access path of registered games. In addition, the game management server 12 receives play data of players using their games from game provider servers 50.

The user management server 14 enrolls players as members and manages the user terminals 70 used by each of the players. User terminals 70 can be mobile devices, or they can be devices such as general computers that can be accessed via wired internet. Here, the management means the registration of user terminals 70 and access management to the system 10 from the registered user terminals 70. In addition, the user management server 14 receives play data of each player from the user terminal 70.

In this embodiment, the clustering system 10 has the game management server 12 and the user management server 14, but this is an example and only a clustering server 20 can be equipped. In this case, the clustering server 20 can be configured to receive the necessary data from an external server instead of collecting the necessary data for the clustering process in person. In other words, in order to implement the clustering method of the invention, the clustering server 20 must collect the play data of each player, and the collection of this play data will be performed directly by the clustering system 10 when the clustering system 10 is configured as in FIG. 1. However, if it is not configured as in FIG. 1 and only the clustering server 20 is configured, play data can be obtained from another external server (not shown) outside.

Here, the play data is the information about the players that is collected based on the results of playing various games. Specifically, play data may include one or more of the player's personal information, play time, play frequency, play level, and game dropout rate. Various types of play data can be used for clustering players, but in this case, the present invention performs the player clustering process mainly based on play time.

Figure 2:
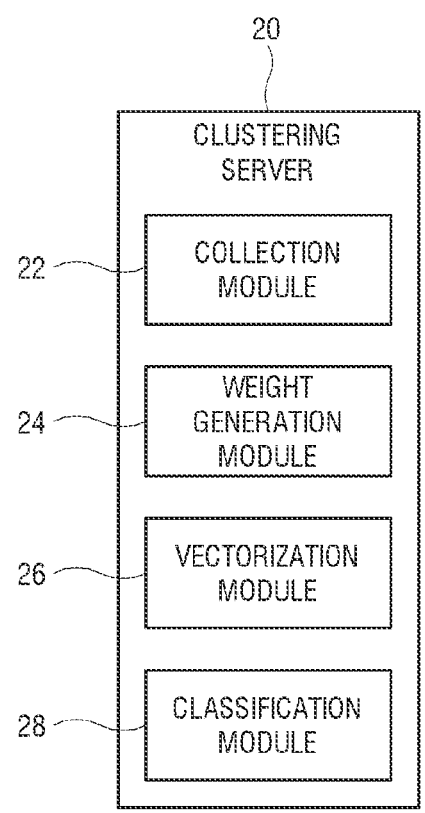
FIG. 2 is a diagram showing the clustering server in FIG. 1.

FIG. 2 is a diagram showing the clustering server 20 in FIG. 1. The clustering server 20 has a collection module 22, a weight generation module 24, a vectorization module 26, and a classification module 28.

The collection module 22 is a module that collects play data. In the case where the clustering system 10 is configured as shown in FIG. 1, the collection module 22 can receive the play data from the game management server 12 and/or the user management server 14. In the case where the clustering system 10 is only configured with the clustering server 20, the collection module 22 can collect the play data from a separate external server (not shown) that collects the play data.

The weight generation module 24 is a module that generates weights for tags for each player based on the play data. Here, tags are assigned to each game to be matched with its characteristics in order to express its characteristics, and the weight generation module 24 has the information about tags assigned for each game in advance.

The vectorization module 26 vectorizes the weights generated for each tag for each player by the weight generation module 24. Additionally, the vectorization module 26 converts the vectorized vector data from a high-dimensional vector to a low-dimensional vector to reduce the amount of computation for clustering.

The classification module 28 classifies players into a plurality of clusters according to their tendencies based on the weights generated for each tag for each player. In this case, the classification module 28 uses the low-dimensional vector generated from the vectorization module 26 for the classification of the cluster as a specific way to classify based on the weight.

Hereinafter, the process of the present invention having such a configuration is described.

1. Tag Setting

First, we describe the tags used to implement the present invention.

The tag is an element used to represent the characteristics of each game. For example, if a game (a) has a player who establishes a strategy and plays based on it, has a splendid screen composition, and has a scenario that an opponent exists, then tags such as "strategy", "splendid", and "opponent" can be assigned. In order to assign tags, tags must be defined in advance.

In order to define the tags, several categories that express the characteristics of the games are set up, and then the tags of each category are set up. Here, the category is a classification that separates and grasps the characteristics of the game from various perspectives, and as an example, it is composed as follows, and tags can be defined as follows for each category.

Genre: Strategy, Racing, Sports, Puzzle . . .
Character: Male, Female, Robot, Muscle . . .
Screen composition: Wonderful, Splendid, Funny, Simple
. . .
Play time: Very short, Short, Medium, Long, Very long
Number of players: Single, 2 players, 3 or more . . .

For example, "genre" is a category according to the game's scenario, and the "genre" category includes tags such as "strategy", "racing", "sports", and "puzzle". In this way, the characteristics of the games are classified into a plurality of categories, and a plurality of tags are defined within each category.

These categories and tags are defined by the manager of the clustering server 20 and stored in the weight calculation module 24. The set categories and tags can be changed by the manager later.

The manager assigns tags to each category of game (a) as classified above. For example, the tags of game (a) may be "strategy", "male". "splendid", "long", and "3 or more". The assignment of these tags can be performed by the game developer or by the manager of the clustering server 20. Information about the tags assigned to game (a) is stored in the weight calculation module 24.

On the other hand, tags for each game do not need to be assigned for all categories. For example, only two tags "sports" and "splendid" can be assigned to game (m).

2. Collection of Play Data

The collection module 22 collects the play data. In a preferred embodiment of the present invention, the play data is the play time of each player for each game. That is, the collection module 22 collects information on which games each player has played for how many hours in the past (or during a specific period of time such as the past 1 year) and provides it to the weight calculation module 24.

For example, if player 1 (P1) played game (a) for 10 hours, game (b) for 30 hours, and player 2 (P2) played game (b) for 5 hours, then data such as "game (a) 10 hours, game (b) 30 hours" for player 1 (P1) and "game (b) 5 hours" for player 2 (P2) is obtained. By performing such data for all players who are the target of clustering, data structured as in Table 1 is obtained, for example.

TABLE 1

|  | P1 | P2 | Pn |
|---|---|---|---|
| Game (a) (T1, T3, T11) | 10 | 0 | ... |
| Game (b) (T3, T20) | 30 | 5 |  |
| . |  | 0 | 0 |
| . |  | 0 | 0 |

3. Weight Calculation

The weight is calculated for each player, and also calculated for each tag of each player. Specifically, the total play time of all players for a given tag-assigned game is used as the denominator, and the play time of each player for a given tag-assigned game is used as the numerator. The ratio is calculated to obtain the weight of a particular tag for a particular player. This process is performed for all tags.

For example, suppose that the tags assigned to game (a) are 'T1, T3, T11', and the tags assigned to game (b) are 'T3, T20'. By playing game (a). P1 receives 10 hours of play time for each of T1, T3, and T11, and by playing game (b), T3 and T20 receive 30 hours of play time each. And by playing game (b), P2 receives 5 hours of play time for each of T3 and T20. Assuming that P1 and P2 constitute the entire player population, and calculating the total play time by tag, T1=10. T3=10+30+5=45, T11=10, T20=30+5=35.

Calculating the weight for each tag for P1, T1=10/10=1, T3=(10+30)/45=0.89, T11=10/10=1, T20=30/35=0.86, and the rest of the tags are all '0'.

Calculating the weight for each tag for P2, T3=5/45=0.11, T20=5/35=0.14, and the rest of the tags are all '0'.

By performing this process for all tags based on the play data of all players, the weights of all tags for all players are calculated.

4. Vectorization of Weight

Figure 3:
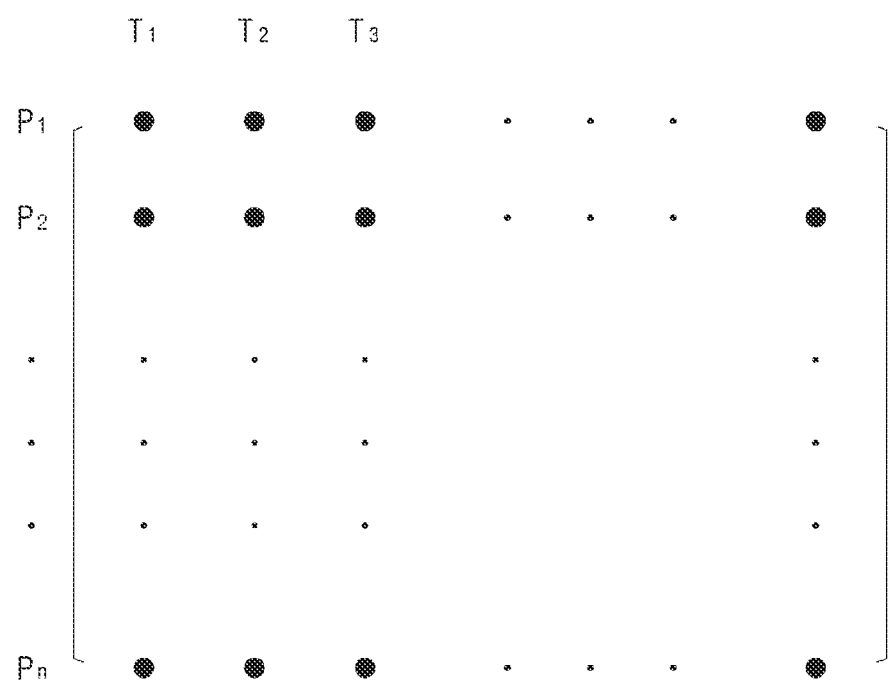
FIG. 3 is a diagram showing the status in which the player's characteristics are vectorized by the vectorization module in FIG. 2.

The vectorization module 26 writes the weights of each tag for each player, calculated by the weight calculation module 24, as a vectorized data. As a result, a vector data with the form of a matrix such as in FIG. 3 is obtained. This vector data is used as the basic data for clustering.

However, since these vector data are very large in amount, it is necessary to reduce the amount of data in order to reduce the amount of calculation for clustering. In other words, when the dimension of the data increases linearly, the amount of calculation for the algorithms for clustering described later increases exponentially, and also the high-dimensional data decreases the density and quality of the information, and the problem of overfitting occurs.

Figure 4:
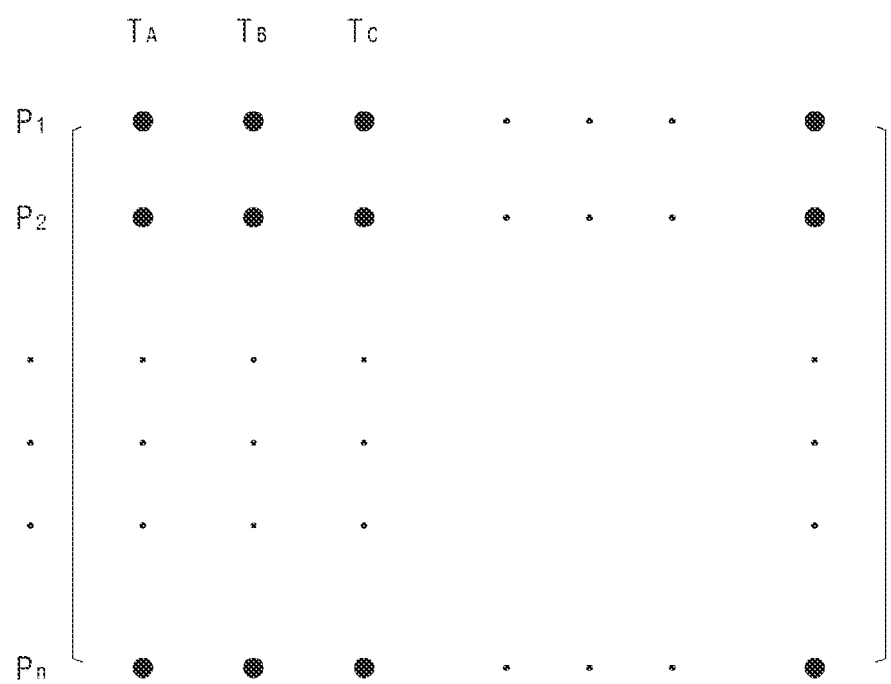
FIG. 4 is a diagram showing the status in which the high-dimensional vector in FIG. 3 is changed to a low-dimensional vector.

To reduce the amount of data, the vectorization module 26 converts the high-dimensional vector in FIG. 3 to a low-dimensional vector such as in FIG. 4. For this, for example, the tSNE algorithm can be used. Generally, principal component analysis PCA and T-distributed stochastic neighbor embedding tSNE can be used for converting to the low-dimensional vectors. However, in the case of PCA, since the values are projected in a linear analysis manner, as the dimension decreases, the clustered data are bundled together so that they cannot be properly distinguished. As a dimensionality reduction method to solve this problem, it is desirable to use tSNE in the present invention.

In FIG. 4, in comparison with FIG. 3, the number of rows, that is, the number of players (Pn), is the same, and the number of columns, that is, the number of tags, is reduced. Since the final classification target is players, the player should remain the same, and the number of tags is reduced so that the amount of calculation can be reduced to a significant level. The number of columns in the low-dimensional vector in FIG. 4 can be reduced by setting the number of columns that are finally intended in the tSNE algorithm. At this time, the factors such as TA. TB that constitute each column are no longer the elements that express a specific tag, and they correspond to elements that have the property of a mathematical combination of tags in the result calculated as a low-dimensional vector.

For example, the number of columns (tags) in FIG. 3 is about 30, and the number of columns in FIG. 4 is about 10. In this way, the number of columns can be reduced to significantly reduce the amount of calculation for clustering.

5. Clustering

The classification module 28 receives the data of the low-dimensional vector in FIG. 4 from the vectorization module 26 and performs clustering. The classification module 28 applies a predetermined clustering algorithm to the vector data in FIG. 4 for clustering, and preferably uses the K-means algorithm, which is suitable for clustering in unsupervised learning, considering that the clustering of this invention is unsupervised learning. Unlike supervised learning, unsupervised learning is used when learning is performed without knowing the answer, and clustering belongs to this unsupervised learning. The K-means algorithm can perform meaningful clustering from a large amount of data without prior information with a low computational cost.

Figure 5:
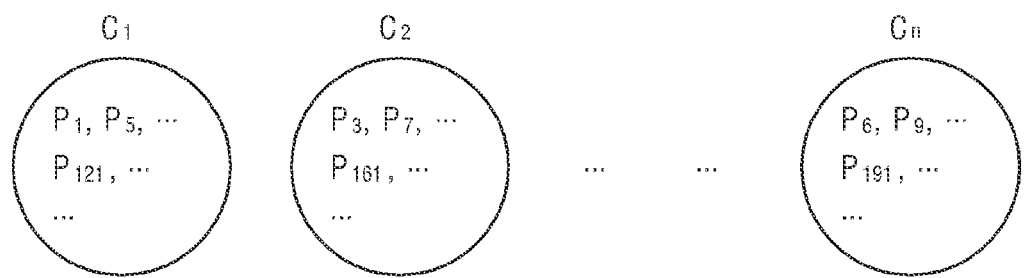
FIG. 5 is a diagram showing the status in which each player is clustered with respect to the low-dimensional vector in FIG. 4.

FIG. 5 is a conceptual diagram showing the results of clustering. All players are classified into one of the clusters (C1, C3 . . . . Cm). Each cluster of C1~Cm represents a set of players with similar tendencies to the game.

6. Utilization of Clustering Results

Suppose a game developer has released a new game (f). The game developer or the manager of the clustering system 10 defines the characteristics of the game (f). One way to define the characteristics is to assign the tags to the game (f), according to the same way as described above.

For example, if the characteristics of the game (f) are expressed in tags, it can be a vector as follows.

Game (f)=[1, 0, 0, 1, . . . , 1, 0]

In the above vector, each column consists of a column of tags that are the same as one column in the matrix in FIG. 3, and the numbers '0' and '1' indicate whether the characteristic of each tag exists in the game (f). For the vector of the game (f) as above, the similarity operation is performed with each cluster (C1, C3 . . . . . . . Cm) in FIG. 5. The similarity operation can be performed by calculating the distance between the two vectors. Therefore, for example, the similarity between the vector of each player in cluster C1 and the vector of the game (f) is calculated for each player, and the correlation between C1 and the game (f) is calculated by averaging it for each player.

After calculating the correlation for all clusters, the cluster with the highest correlation is selected as the cluster that best suits the characteristics of the game (f). By targeting advertising for the game (f) to the players in the selected cluster, the effectiveness of advertising can be increased.

The above embodiment of the present invention can be varied in a variety of ways, as follows.

The aforementioned embodiment used the play time as the play data. The play time for a particular game can be the most appropriate measure for judging how much a player prefers that game. However, there are cases where players enjoy games but cannot devote a lot of time, and in such cases, the frequency of play, for example, how many times a week they play, may be more important than the total play time.

In consideration of this, the play frequency can be used as the play data instead of the play time in the aforementioned embodiment. Furthermore, both the play time and the play frequency can be used. In this case, the time and the frequency can be assigned a predetermined weight each. For example, the time can be weighted '3' and the frequency can be weighted '1', and the final weight for the 'time' calculated in the same way as the aforementioned can be multiplied by 3 and the weight for the 'frequency' calculated in the same way can be added. This value can be finally used as the weight constituting the matrix.

In this way, the disadvantage that the weight of a player who is considered to have a high interest in the game due to frequent frequency is treated as low importance in the calculation process can be prevented.

In addition, in the aforementioned embodiment, each category was given equal importance when calculating the weight. However, different weights can be assigned to each category. In other words, it is not reasonable to deem that all the categories mentioned above have the same importance in representing the player's tendency. For example, the 'genre' category can be deemed as largely representing the player's tendency, but the 'screen composition' category can be deemed as representing the player's tendency to a lesser extent. In consideration of this, different weights can be assigned to each category. For example, if 'genre' is assigned a weight of '3' and 'screen composition' is assigned a weight of '0.5', the values of the matrix in FIG. 3 calculated based on the aforementioned Table 1 will be changed to 3 times for the tags of the 'genre' category and 0.5 times for the tags of the 'screen composition' category.

In this way, the tags of the categories with a higher importance in determining the player's tendency can be reflected with a higher weight in the player's clustering process.

The above embodiment has been described with reference to the figures, but this is only an example, and a person having ordinary skill in the art will understand that various modifications and equivalent embodiments are possible from this. Therefore, the true technical protection scope of the present invention should be determined by the technical idea of the attached claims.

The invention claimed is:

1. A method for clustering players according to their tendencies, the method performed by a server that collects play data, which is data related to game play of a plurality of players playing games, the method comprising the steps of:
   a) storing information to which tags that express characteristics of the respective games are assigned for each of the games;
   b) computing weights for the respective tags based on the play data related to the games to which the tags are assigned, with respect to the players; and
   c) classifying the players according to their tendencies into a plurality of clusters, based on the weights computed for each of the tags for each of the players,
   wherein the play data includes at least one of time and frequency at which each of the players plays each of the games, and
   wherein, in the step (b), the weight is calculated based on a ratio of the time and/or the frequency that each of the players plays the game to which a specific tag is assigned, with respect to the time and/or the frequency that all of the players plays the game to which the specific tag is assigned.

2. The method of claim 1, wherein, in the step (b), the weight is calculated by assigning predetermined weights to the time and the frequency respectively.

3. The method of claim 1, wherein the characteristics of the games are classified into a plurality of categories, and the tags are defined for each of the plurality of categories.

4. The method of claim 3, wherein a plurality of the tags are defined for each of the plurality of categories.

5. The method of claim 3, wherein, in the step (b), the weight is calculated by assigning predetermined weights to each of the plurality of categories.

6. The method of claim 1, wherein the step (c) comprises the steps of:
   c-1) writing a vector data that vectorizes the weights for each of the tags for each of the players; and
   c-2) classifying the plurality of clusters by applying a predetermined clustering algorithm to the vector data.

7. The method of claim 6, further comprising a step of converting the vector data to a low-dimensional vector before performing the step c-2).

\* \* \* \* \*